United States Patent Office.

KIRK W. HOLMES, OF McGRAWVILLE, AND ANDREW ALBRIGHT, OF DRYDEN, NEW YORK.

Letters Patent No. 64,419, dated May 7, 1867

IMPROVED MODE OF COATING WOOD WITH RUBBER AND GUTTA PERCHA.

*The Schedule referred to in these Letters Patent and making part of the same.*

TO ALL WHOM IT MAY CONCERN:

Be it known that we, KIRK W. HOLMES, of McGrawville, in the county of Cortland, and State of New York, and ANDREW ALBRIGHT, of Dryden, in the county of Tompkins, same State, have invented a new and improved Mode of Coating Wood with Rubber, Gutta Percha, or Prepared Gum; and we do hereby declare that the following is a full and exact description thereof, reference being had to the accompanying drawings, and to the letters of reference marked thereon.

To enable others skilled in the art to make and use our invention, we will proceed to describe its construction and operation.

The wood to be acted upon is first prepared in the form desired; the rubber, gutta percha, or gum is then applied to the wood, which is placed in a mould suited to the object in view, and this is then placed in a boiler or vulcanator and subjected to proper degree of heat for hardening the substance applied. The form of rubber, &c., and its thickness are adapted to the character of the article to which it is to be applied. This process in application of rubber, &c., is found exceedingly valuable as well as ornamental on carriage and cutter bodies, on picture frames, coffins, and burial cases, and very many other articles. It preserves the wood from rust and decay, dispenses with paints and varnishes, and enables its use in all conditions of the atmosphere without any fear of injury. This application may be washed without injury, and retains its beauty and elasticity.

What we claim as our invention, and desire to secure by Letters Patent, is—

The coating and lining of wood with rubber, gutta percha, or prepared gum, substantially as set forth

K. W. HOLMES,
ANDREW ALBRIGHT.

Witnesses:
    N. STARR, Jr.,
    ARTHUR HOLMES.